US010652463B2

(12) United States Patent
Hashimoto (10) Patent No.: US 10,652,463 B2
(45) Date of Patent: May 12, 2020

(54) IMAGING DEVICE HAVING A CHARGE CONTROLLER FOR REGULATING BATTERY CHARGING DURING INTERVAL SHOOTING

(71) Applicant: Panasonic Intellectual Property Management Co., Ltd., Osaka (JP)

(72) Inventor: Shingo Hashimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 42 days.

(21) Appl. No.: 16/010,198

(22) Filed: Jun. 15, 2018

(65) Prior Publication Data

US 2019/0020819 A1 Jan. 17, 2019

(30) Foreign Application Priority Data

Jul. 13, 2017 (JP) ................................. 2017-137186

(51) Int. Cl.
*H04N 5/232* (2006.01)
*H04N 5/3745* (2011.01)
(Continued)

(52) U.S. Cl.
CPC ......... *H04N 5/23241* (2013.01); *H02J 7/007* (2013.01); *H02J 7/0047* (2013.01); *H04L 12/10* (2013.01); *H04L 12/40045* (2013.01); *H04N 5/232* (2013.01); *H04N 5/232411* (2018.08); *H04N 5/3745* (2013.01); *H02J 7/00* (2013.01); *H02J 7/0048* (2020.01); *H02J 2007/0067* (2013.01)

(58) Field of Classification Search
CPC .. H04N 5/23241; H04N 5/3745; H04N 5/232; H04N 5/232411; H02J 7/007; H02J 7/0047; H02J 2007/005; H02J 7/00; H02J 7/0048; H02J 2007/0067; H04L 12/40045; H04L 12/10
See application file for complete search history.

(56) References Cited

U.S. PATENT DOCUMENTS 5,926,661 A * 7/1999 Maeno ..................... G03B 7/26
396/277
8,957,979 B2 * 2/2015 Ishino ................. H04N 5/23222
348/220.1
(Continued)

FOREIGN PATENT DOCUMENTS

| JP | 2006-041674 | 2/2006 |
| JP | 2008-289236 | 11/2008 |
| WO | 2002/001695 | 1/2002 |

*Primary Examiner* — Luong T Nguyen
(74) *Attorney, Agent, or Firm* — Renner, Otto, Boisselle & Sklar, LLP (57) ABSTRACT

An imaging device is capable of interval shooting that allows images to be consecutively captured at predetermined image-capture intervals. The imaging device includes power input unit through which the imaging device receives power from an external device; battery configured to be charged with power received via the power input unit, and to supply power to operate the imaging device; and charge controller configured to control charging of the battery. Charge controller prohibits, under a predetermined condition, charging of the battery during the interval shooting performed by the imaging device.

11 Claims, 8 Drawing Sheets

(51) Int. Cl.
*H02J 7/00* (2006.01)
*H04L 12/40* (2006.01)
*H04L 12/10* (2006.01)

(56) References Cited

U.S. PATENT DOCUMENTS

| | | |
|---|---|---|
| 2002/0121879 A1 | 9/2002 | Inoue |
| 2012/0051522 A1* | 3/2012 | Nishino ............... A61B 6/4007 378/108 |
| 2013/0063645 A1* | 3/2013 | Aoyama ............ H04N 5/23293 348/333.01 |
| 2013/0272691 A1* | 10/2013 | Yamaguchi .............. G03B 7/26 396/301 |

* cited by examiner

IMAGING DEVICE HAVING A CHARGE CONTROLLER FOR REGULATING BATTERY CHARGING DURING INTERVAL SHOOTING

BACKGROUND

1. Technical Field

The present disclosure relates to an imaging device having an interval shooting capability that allows images to be consecutively captured at regular time intervals.

2. Description of the Related Art

Disclosed in JP 2006-41674 A is an electronic camera in which a plurality of sets of information can be registered in advance. The information sets each include a combination of a date and time and an operation (such as image capture, image playback, or image deletion). The electronic camera turns on at each registered date and time to perform the operation registered in association with that date and time. In this way, the electronic camera performs the operation desired by the user at the desired time. The electronic camera returns to a turn-off state after completion of the operation, thereby conserving power. When registered information sets each include a combination of an activation date and time and image capture operation, the electronic camera can perform interval shooting in which images are consecutively captured at regular time intervals.

SUMMARY

The present disclosure provides an imaging device that has an interval shooting capability and that is capable of reducing battery deterioration due to interval shooting.

An aspect of the present disclosure provides an imaging device capable of interval shooting that allows images to be consecutively captured at image-capture intervals predetermined beforehand. The imaging device includes: a power input unit through which the imaging device receives from an external device connected to the power input unit; a battery configured to be charged with the power received via the power input unit, and to supply power to operate the imaging device; and a charge controller configured to control charging of the battery. The charge controller prohibits, under a predetermined condition, the charging of the battery during the interval shooting performed by the imaging device.

DETAILED DESCRIPTION

Exemplary embodiments will be described in detail below with reference to the drawings. However, unnecessarily detailed descriptions may be omitted. For example, a detailed description of well-known matters, and a duplicate description of substantially identical configurations may not be provided. This is to avoid unnecessary redundancy in the following description and to facilitate understanding of those skilled in the art. Here, the inventor provides the accompanying drawings and the following description such that those skilled in the art can sufficiently understand the present disclosure, and the subject matters of claims are not intended to be limited by the accompanying drawings and the following description.

First Exemplary Embodiment

[1-1. Configuration]

Figure 1:
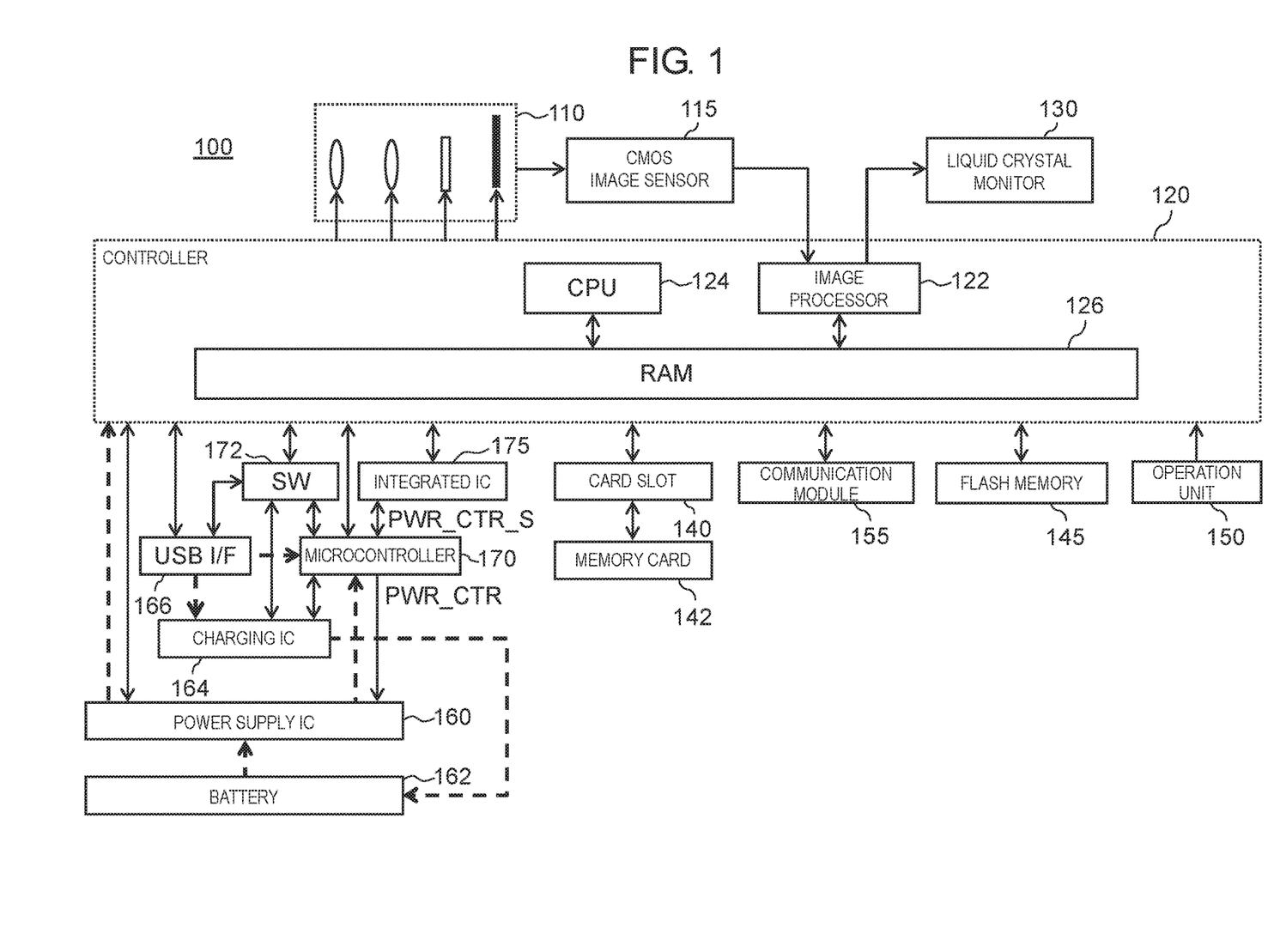
FIG. 1 illustrates a configuration of a digital camera according to a first exemplary embodiment.

FIG. 1 illustrates a configuration of a digital camera according to a first exemplary embodiment of the present disclosure. In FIG. 1, solid-line arrows indicate flows of signals, and broken-line arrows indicate flows of power.

Digital camera 100 captures a subject image formed via optical system 110 by means of complementary metal oxide semiconductor (CMOS) image sensor 115. CMOS image sensor 115 generates captured-image data (raw data) based on the captured subject image. Image processor 122 in controller 120 performs various types of processing on the captured-image data generated through the image capture, thereby generating image data. Controller 120 records the image data generated by image processor 122 in memory card 142 inserted into card slot 140. Controller 120 also displays (i.e., plays back) the image data recorded in memory card 142 on liquid crystal monitor 130 in response to a user action on operation unit 150. Components of digital camera 100 will be described in detail below.

Optical system 110 includes a focusing lens, a zoom lens, an optical camera-shake correction lens (or an optical image stabilizer (OIS)), an aperture, and a shutter, for example. Optical system 110 may include any number of various lenses and any number of lens units.

CMOS image sensor 115 captures a subject image formed via optical system 110 and generates captured-image data. CMOS image sensor 115 generates image data of a new frame at a predetermined frame rate (for example, 30 frames/second). Controller 120 controls a captured-image-data generation timing and an electronic shutter operation in CMOS image sensor 115. The imaging element is not limited to the CMOS image sensor, but may be a different type of image sensor, such as a charge coupled device (CCD) image sensor or an n-channel metal-oxide semiconductor (NMOS) image sensor.

Controller 120 (an example of an overall controller) includes image processor 122, central processing unit (CPU) 124, and random access memory (RAM) 126. Image processor 122 performs various types of processing on the captured-image data output from CMOS image sensor 115, thereby generating image data. Image processor 122 also performs various types of processing on image data read from memory card 142, thereby generating an image to be displayed on liquid crystal monitor 130. Examples of the various types of processing include at least one of white balance correction, gamma correction, YC conversion, electronic zoom, compression, and decompression; however, the various types of processing are not limited to such processing. Image processor 122 may be configured with a hard-wired electronic circuit, or a microcomputer using a program, for example.

Controller 120 provides, using CPU 124, overall control of an entire operation of digital camera 100. Controller 120 may be configured with a single semiconductor chip or a plurality of semiconductor chips. Controller 120 includes a read only memory (ROM), which is not illustrated in the drawings. The ROM stores programs to be executed by CPU 124. The programs include, for example, a program for automatic focus control (AF control), a program for communication control, and a program for overall control of the entire operation of digital camera 100. For example, the ROM stores an image transfer application. The image transfer application is a program that transfers an image captured with digital camera 100 to an external device (for example, smartphone 200).

RAM 126 in controller 120 is a recording medium serving as a work area of CPU 124. RAM 126 is implemented by, for example, a dynamic random access memory (DRAM).

Liquid crystal monitor 130 is disposed on a back face of digital camera 100. Liquid crystal monitor 130 displays an image based on image data processed by image processor 122. Instead of the liquid crystal monitor, another monitor, such as an organic electro luminescence (EL) monitor, may be used.

Card slot 140 is a part into which memory card 142 is detachably inserted. Card slot 140 is capable of electrically and mechanically connecting memory card 142 with digital camera 100. Memory card 142 is an external memory in which a recording element, such as a flash memory, is provided. Memory card 142 stores data, such as image data generated by image processor 122.

Operation unit 150 is used herein as a general term for hard keys, such as an operation button and an operation lever provided on an exterior of digital camera 100. Operation unit 150 receives a user action. Examples of operation unit 150 include at least one of a release button, a mode dial, a touch panel, an operating lever, and a power button. Upon receipt of a user action, operation unit 150 transmits to controller 120 an operation signal corresponding to the user action.

Communication module 155 performs communication in compliance with a predetermined communication standard. In the present exemplary embodiment, the communication module includes a circuit. Examples of the communication standard include the IEEE802.11 or Wi-Fi (registered trademark) standard, the IEEE802.15.1 or Bluetooth (registered trademark) standard, and the near field communication (NFC) standard. Digital camera 100 communicates with another device via communication module 155. Digital camera 100 may communicate with another device via communication module 155 either directly or through an access point.

Battery 162 is a power supply that supplies power to components of digital camera 100. Battery 162 is a rechargeable secondary battery, such as a lithium-ion battery, a nickel-cadmium battery, or a nickel-hydrogen battery. Battery 162 can be charged with power received from an external device via a universal serial bus (USB) cable connected to USB interface 166.

Power supply IC 160 is a circuit which supplies power from battery 162 to components of digital camera 100. Charging IC 164 is a circuit that controls charging of battery 162.

Integrated IC 175 is a circuit that performs various operations. For example, integrated IC 175 has a capability to monitor the on/off state of a power switch.

Microcontroller 170 is a circuit that controls power supply, and charging of battery 162, in digital camera 100.

USB interface 166 is an interface that establishes connection with an external device in accordance with the universal serial bus (USB) standard. USB interface 166 includes a connector that is compliant with the USB standard, and a circuit that performs communication in compliance with the USB standard.

Switch 172 is an analog switch that performs, under control of microcontroller 170, switching to output a data signal (D+signal, D−signal) from USB interface 166 to one of controller 120, charging IC 164, and microcontroller 170.

[1-2. Operation]

An operation of digital camera 100 having the above configuration will be described.

Digital camera 100 according to the present exemplary embodiment has an interval shooting capability that allows images to be consecutively captured at predetermined image-capture intervals. A user can set an operation mode to an interval shooting mode to perform interval shooting, by operating the mode dial of digital camera 100. The user can initiate interval shooting by pressing the release button of digital camera 100 that has been set in the interval shooting mode. The user can terminate the initiated interval shooting by pressing the release button again. The user can set image-capture intervals for the interval shooting at anywhere within a predetermined range (for example, from 1 second to 100 minutes). Such predetermined image-capture intervals may be of fixed length or varying length selected from a range from 1 second to 100 minutes, for example.

In interval shooting, when an image-capture interval is equal to or greater than a first threshold (for example, one minute), controller 120 is controlled to transition to a sleep state between image captures. The sleep state may also be referred to as a sleep mode. In the sleep state, power supply to controller 120 is shut off to stop operation of controller 120. On the other hand, when the image-capture interval is less than the first threshold, controller 120 is controlled not to transition to the sleep state between image captures. Digital camera 100 puts controller 120 in the sleep state to reduce power consumption and conserve power.

Figure 2A:
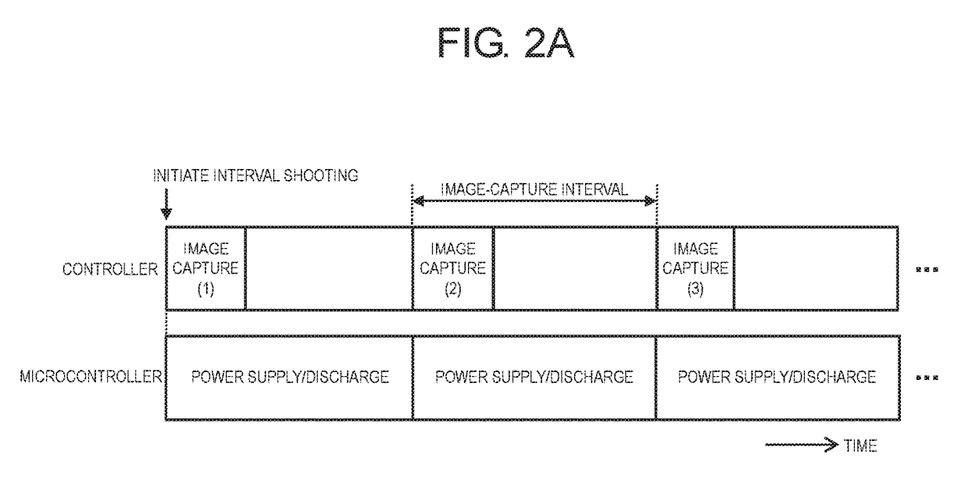
FIG. 2A schematically illustrates operations of a controller and a microcontroller during interval shooting (in which the controller does not transition to a sleep state) according to the first exemplary embodiment.
Figure 2B:
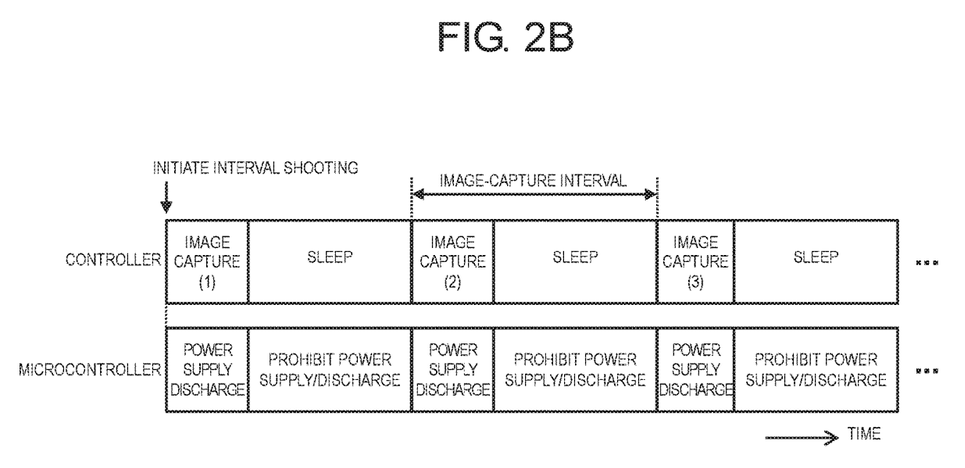
FIG. 2B schematically illustrates operations of the controller and the microcontroller during interval shooting (in which the controller transitions to a sleep state) according to the first exemplary embodiment.

FIGS. 2A and 2B schematically illustrate operations of controller 120 and microcontroller 170 during interval shooting in digital camera 100. FIG. 2A illustrates operations when controller 120 does not transition to a sleep state between image capture operations. FIG. 2B illustrates operations when controller 120 transitions to a sleep state between image capture operations.

As illustrated in FIG. 2A, when controller 120 does not transition to a sleep state between image captures, controller 120 captures images at regular time intervals (i.e., image-capture intervals). Microcontroller 170 controls power supply IC 160 in such a manner that power is supplied to controller 120 during the interval shooting. Controller 120 is supplied with power received via USB interface 166. That is, power is supplied to controller 120 via the USB connection. In this case, if the power received via USB interface 166 is insufficient to operate controller 120, microcontroller 170 controls power supply IC 160 in such a manner that power is supplied to controller 120 from battery 162. To be specific, microcontroller 170 causes battery 162 to discharge, thereby supplying controller 120 with power from battery 162.

On the other hand, when controller 120 transitions to a sleep state between image captures, controller 120 operates as illustrated in FIG. 2B. Specifically, controller 120 captures images at regular time intervals (i.e., image-capture intervals), and after completion of each image capture, controller 120 enters and remains in the sleep state until a next image capture. Digital camera 100 conserves power by putting controller 120 in the sleep state.

Microcontroller 170 controls power supply IC 160 in such a manner that controller 120 is supplied with power during the time that controller 120 performs each image capture operation. Controller 120 is supplied with power received via USB interface 166. That is, power is supplied to controller 120 via the USB connection. In this case, if the power received via USB interface 166 is insufficient to operate controller 120, microcontroller 170 controls power supply IC 160 in such a manner that power is supplied to controller 120 from battery 162. To be specific, microcontroller 170 causes battery 162 to discharge, thereby supplying controller 120 with power from battery 162.

When controller 120 has completed the image capture operation and transitioned to the sleep state, microcontroller 170 causes power supply IC 160 to stop the power supply (i.e., the power supply via the USB connection) to controller 120 and the discharging (i.e., the discharging of battery 162). At this time, microcontroller 170 causes power supply IC 160 and charging IC 164 to prohibit (stop) charging of battery 162. In this way, microcontroller 170 prohibits (stops) charging of battery 162 when controller 120 is in the sleep state. The following describes a reason for such control.

At the time of the image capture operation, if the power received via USB interface 166 is insufficient to operate controller 120, controller 120 is supplied with power from battery 162 (that is, battery 162 is discharged). In this case, if charging of battery 162 is performed with controller 120 being in the sleep state, battery 162 would be repeatedly charged and discharged in the interval shooting. Such repeated charging and discharging would cause memory effect, resulting in deterioration of battery 162. Hence, in the present exemplary embodiment, when controller 120 is in the sleep state, charging of battery 162 is prohibited (stopped) to reduce repetition of charging and discharging of battery 162, thereby reducing battery deterioration.

Figure 3A:
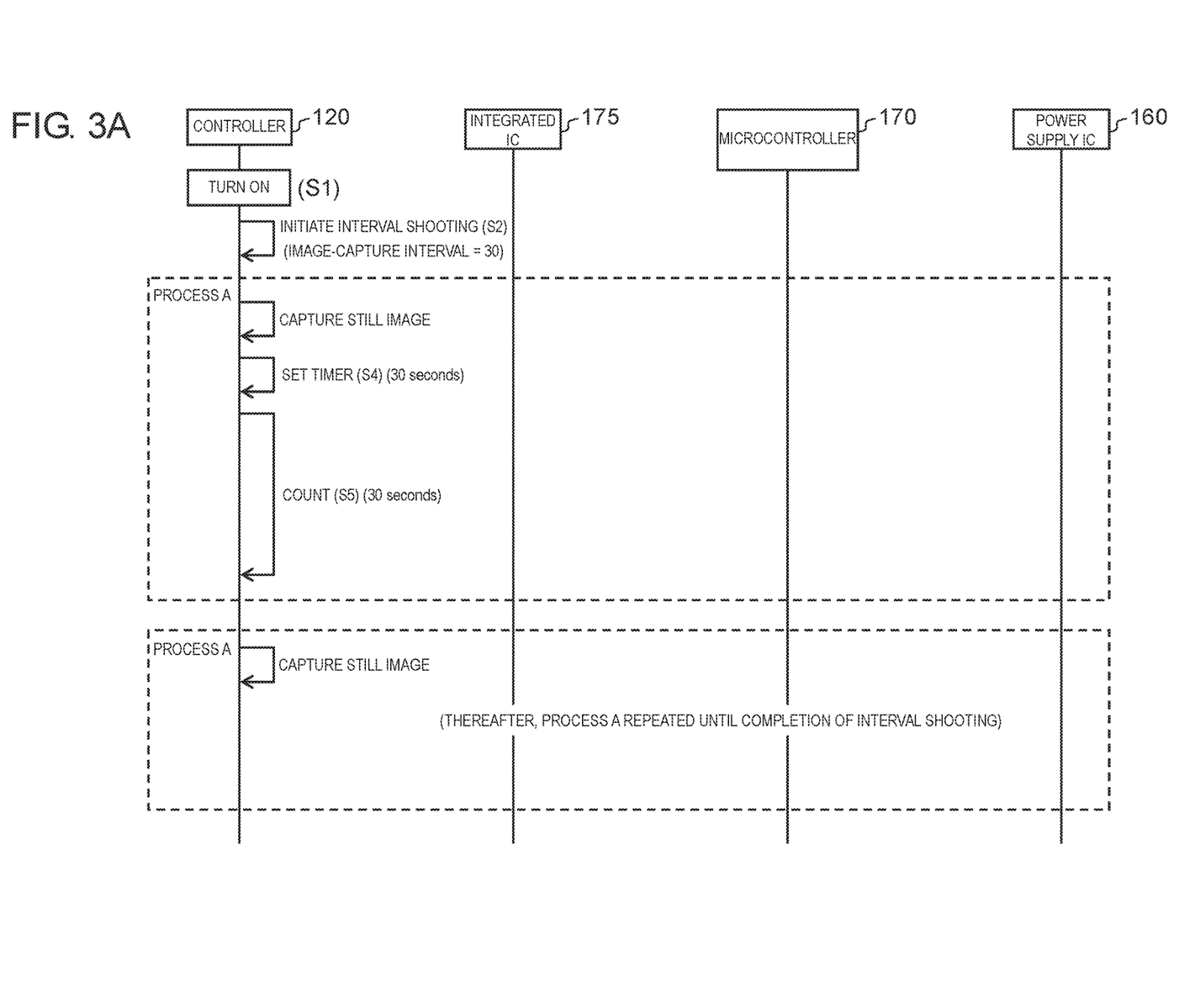
FIG. 3A is a sequence diagram during an interval shooting operation in the digital camera (in which the controller does not transition to a sleep state) according to the first exemplary embodiment.
Figure 3B:
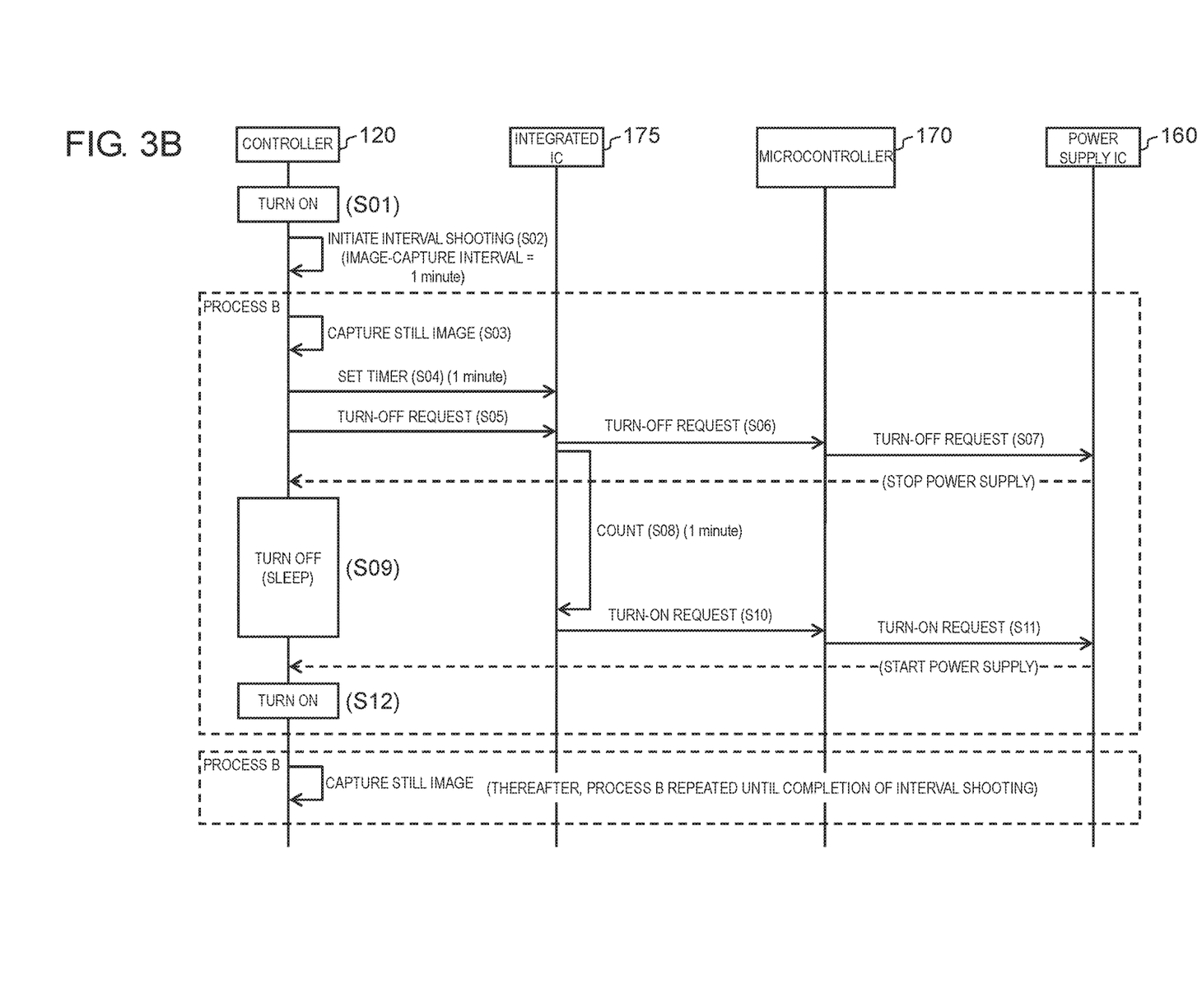
FIG. 3B is a sequence diagram during an interval shooting operation in the digital camera (in which the controller transitions to a sleep state) according to the first exemplary embodiment.

FIGS. 3A and 3B are sequence diagrams during interval shooting operations in digital camera 100. FIG. 3A is a sequence diagram illustrating an operation when controller 120 does not transition to a sleep state between image capture operations. FIG. 3B is a sequence diagram illustrating an operation when controller 120 transitions to a sleep state between image capture operations. With reference to FIGS. 3A and 3B, operations of components of digital camera 100 during interval shooting operations will be described.

Interval shooting in which controller 120 does not transition to a sleep state between image capture operations is performed as illustrated in FIG. 3A. Specifically, when digital camera 100 is turned on (S1), power is supplied to controller 120 to activate controller 120. In digital camera 100 set in the interval shooting mode, when the user performs an action to initiate interval shooting, an interval shooting operation is initiated (S2). The user can set image-capture intervals as desired, for example, on a menu screen. In the following description, it is assumed that the image-capture intervals are set to "30 seconds".

Upon the initiation of the interval shooting operation, controller 120 captures a subject image and generates still image data with CMOS image sensor 115 and image processor 122 (S3). Controller 120 then sets a timer included in controller 120 (S4). In the present exemplary embodiment, controller 120 sets the timer for "30 seconds", which correspond to the length of time of the image-capture intervals.

According to this setting, controller 120 starts measuring the time (S5). Upon measuring "30 seconds" with the timer in controller 120, controller 120 recognizes that 30 seconds (i.e., the length of time of the image-capture interval) have elapsed.

Upon recognizing the elapse of 30 seconds, controller 120 captures a still image (S6). Thereafter, process steps (S4 to S5) described above are repeated.

Process A which includes example operations S3 to S6 set forth above is repeated until the interval shooting operation is terminated. Accordingly, images are consecutively captured at the regular time intervals (the image-capture intervals). Image data of the captured images is recorded in memory card 142. The interval shooting operation is terminated by a user action (by pressing the release button again). The interval shooting operation is also terminated in other cases, such as when a remaining capacity (an amount of charge) of battery 162 reaches or falls below a predetermined value, and when a remaining capacity of the memory card reaches or falls below a predetermined value.

On the other hand, interval shooting in which controller 120 transitions to a sleep state between image capture operations is performed as illustrated in FIG. 3B. Specifically, when digital camera 100 is turned on (S01), power is supplied to controller 120 to activate controller 120. When the user performs an action to initiate interval shooting, an interval shooting operation is initiated (S02).

Upon the initiation of the interval shooting operation, controller 120 captures a subject image and generates still image data with CMOS image sensor 115 and image processor 122 (S03). Controller 120 then instructs integrated IC 175 to set the timer (S04). In response to the instruction, integrated IC 175 starts measuring "one minute" (S08).

Controller 120 also requests integrated IC 175 to turn off controller 120 (S05). For example, controller 120 switches a value of control signal (POWER_ON_H) for making a request to turn off controller 120 from "High" to "Low". Upon receipt of the turn-off request, integrated IC 175 requests microcontroller 170 to turn off controller 120 (S06). For example, integrated IC 175 switches a value of control signal (POWER_CTR_SW) from "High" to "Low" to make a request to turn off controller 120. Upon receipt of the turn-off request, microcontroller 170 requests power supply IC 160 to turn off controller 120 (S07). For example, microcontroller 170 switches a value of control signal (PWR_CTR) for making a request to turn off controller 120 from "High" to "Low". Upon receipt of the turn-off request, power supply IC 160 stops power supply to controller 120. Accordingly, power supply to controller 120 is stopped, putting controller 120 in a turn-off state (S09). This state is referred to as a sleep state or a sleep mode.

When the timer has measured "one minute" (S08), integrated IC 175 transmits a request to turn on controller 120 to microcontroller 170 (S10). For example, integrated IC 175 switches a value of control signal (PWR_CTR_SW) for making a request to turn on controller 120 from "Low" to "High". Upon receipt of the turn-on request, microcontroller 170 transmits a request to turn on controller 120 to power supply IC 160 (S11). For example, microcontroller 170 switches a value of control signal (PWR_CTR) for making a request to turn on controller 120 from "Low" to "High". Upon receipt of the turn-on request, power supply IC 160 begins power supply to controller 120. Accordingly, controller 120 is supplied with power and turns on (S12).

Process B which includes example operations S03 to S11 set forth above is repeated for each image-capture interval, thereby allowing images to be consecutively captured at the image-capture intervals until the interval shooting operation is terminated.

Figure 4:
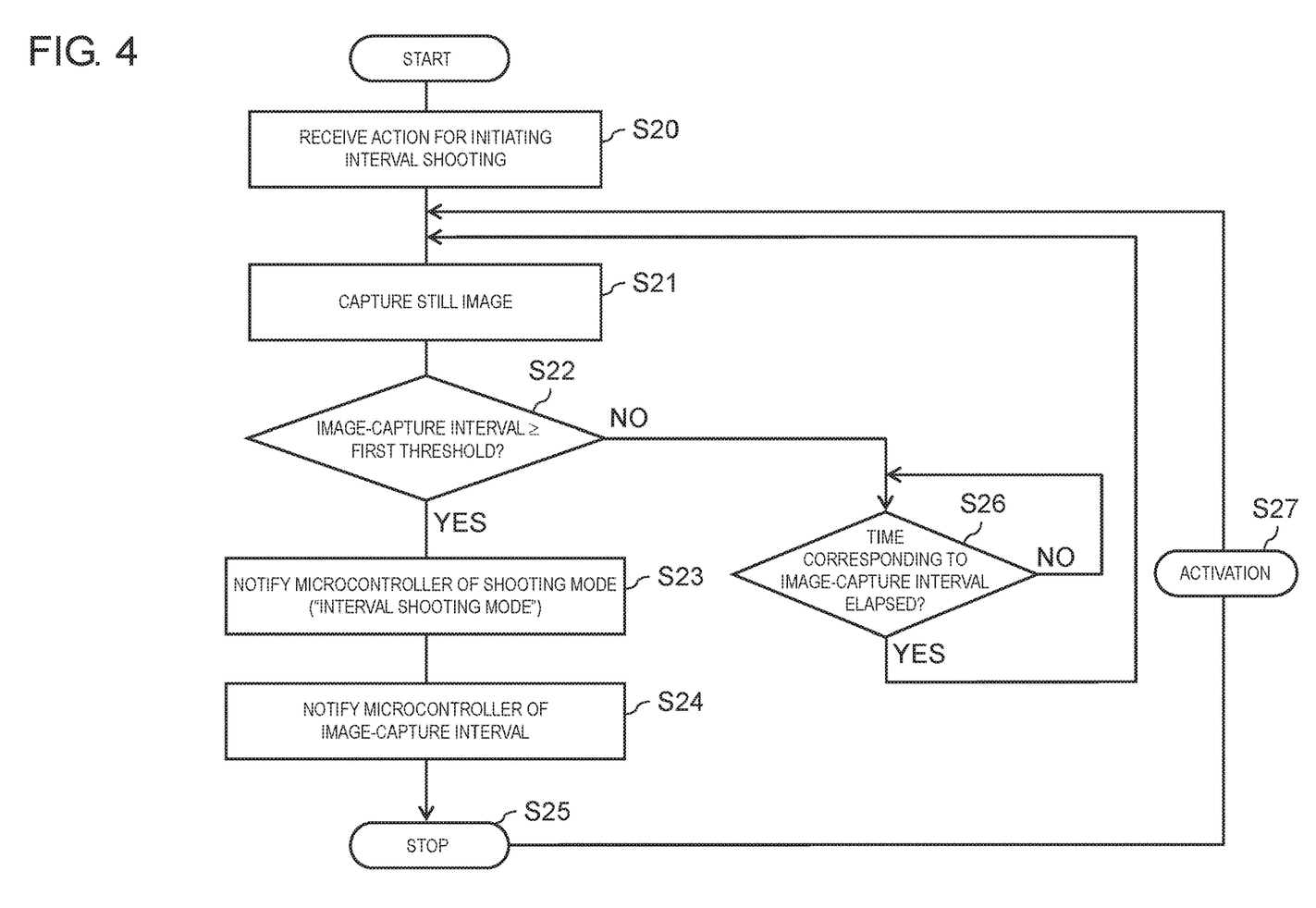
FIG. 4 is a flowchart illustrating how the controller operates according to the first exemplary embodiment.

FIG. 4 is a flowchart illustrating how controller 120 operates when digital camera 100 performs interval shooting. With reference to FIG. 4, the operation of controller 120 during interval shooting will be described.

In the interval shooting mode, upon receipt of a user action on the release button (S20), controller 120 initiates an interval shooting operation. Controller 120 first controls, for example, CMOS image sensor 115 to capture a still image (S21). Image data of the captured still image is recorded in memory card 142.

Controller 120 then determines whether a set image-capture interval is at least the first threshold (S22). As described above, the first threshold (an example of a third predetermined value) is a reference threshold that is used to make a determination in interval shooting as to whether to cause controller 120 to transition to the sleep state after an image capture. The first threshold is set to one minute, for example.

If the set image-capture interval is less than the first threshold (NO in S22), controller 120 captures a still image (S21) after a length of time indicated by the image-capture interval has elapsed (S26). In this way, when the set image-capture interval is less than the first threshold, controller 120 captures still images at the regular image-capture intervals without transitioning to the sleep state.

On the other hand, if the set image-capture interval is at least the first threshold (YES in S22), controller 120 transitions to the sleep state after capturing an image. At this time, controller 120 notifies microcontroller 170 of the shooting mode (i.e., the "interval shooting mode") that is currently set in digital camera 100 (S23). Further, controller 120 notifies microcontroller 170 of the image-capture interval (for example, one minute) (S24). Controller 120 then transmits a turn-off request to microcontroller 170 to stop the operation of controller 120 (S25). That is, as a result of the turn-off request transmitted by controller 120 to microcontroller 170, power supply to controller 120 is stopped, causing controller 120 to stop operating. Consequently, controller 120 enters the sleep state.

As set forth above, in the present exemplary embodiment, controller 120 notifies microcontroller 170 of information on the shooting mode (the "interval shooting mode") and information on the image-capture interval, before transitioning to the sleep state. By referring to these pieces of information received from controller 120, microcontroller 170 controls charging of battery 162 in different ways depending on whether interval shooting is being performed, and also depending on the image-capture interval.

As described above, when the length of time corresponding to the image-capture interval has elapsed since controller 120 enters the sleep state, integrated IC 175 and microcontroller 170 resume power supply to controller 120. Accordingly, when the length of time corresponding to the image-capture interval has elapsed after controller 120 transitions to the sleep state, power supply to controller 120 is resumed to activate controller 120 (S27). When activated, controller 120 proceeds to step S21, where controller 120 captures a still image. Thereafter, process steps (S21 to S27) set forth above are repeated to perform the interval shooting.

Figure 5:
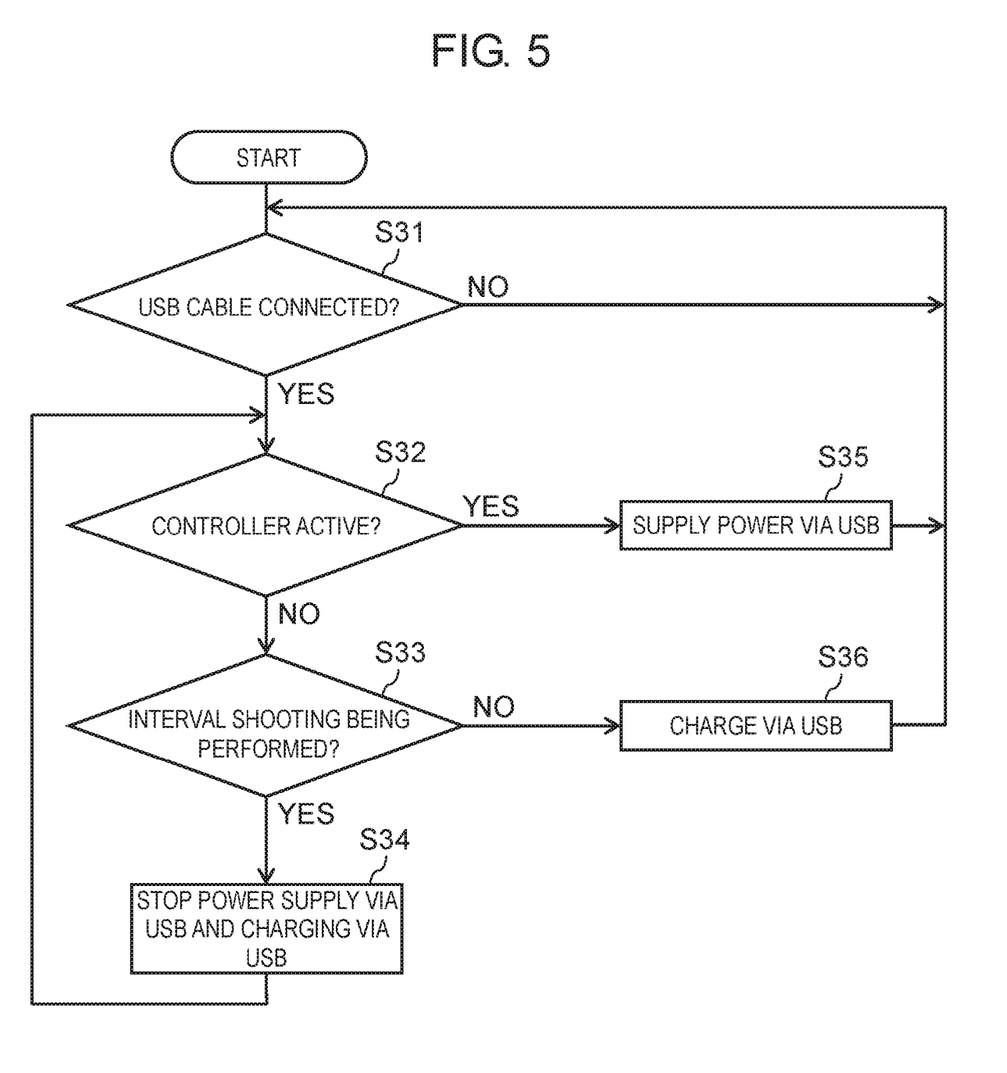
FIG. 5 is a flowchart illustrating how the microcontroller operates according to the first exemplary embodiment.

FIG. 5 is a flowchart illustrating how microcontroller 170 operates. With reference to FIG. 5, charge control and power supply control by microcontroller 170 will be described.

Microcontroller 170 determines whether a USB cable is connected to USB interface 166, based on the presence or absence of a voltage from the USB cable (S31). The USB cable is connected with an external device capable of supplying power in compliance with the USB interface standard. Examples of the external device include a personal computer (PC) and an AC adapter for charging. In other words, it can be said that a determination is made in step S31 as to whether power can be received from an external device via USB interface 166. If no USB cable is connected to USB interface 166 (NO in S31), microcontroller 170 waits for connection of a USB cable to USB interface 166.

If a USB cable is connected to USB interface 166 (YES in S31), microcontroller 170 determines whether controller 120 is active or inactive (S32). The case where controller 120 is inactive includes a case where controller 120 is in the sleep state.

If controller 120 is active (YES in S32), microcontroller 170 supplies controller 120 with power received via USB interface 166. That is, power is supplied to controller 120 via the USB connection (S35).

If controller 120 is inactive (NO in S32), microcontroller 170 determines whether an interval shooting operation is being performed (S33). If controller 120 is inactive, and an interval shooting operation is being performed, microcontroller 170 has been notified by controller 120 of information on shooting mode, which indicates that digital camera 100 is in the interval shooting mode (S23 in FIG. 4). Thus, microcontroller 170 is able to determine whether an interval shooting operation is being performed, in accordance with the information on shooting mode from controller 120.

If an interval shooting operation is not being performed (NO in S33), microcontroller 170 controls charging IC 164 in such a manner that battery 162 is charged with power received via USB interface 166 (that is, battery 162 is charged via the USB connection) (S36).

If an interval shooting operation is being performed (YES in S33), controller 120 is in the sleep state. In this case, microcontroller 170 stops power supply to controller 120 and charging of battery 162 with power received via USB interface 166 (S34).

In this way, charging of battery 162 is stopped (prohibited) in digital camera 100 when controller 120 is in the sleep state in the interval shooting operation. Consequently, repetition of charging and discharging of battery 162 is inhibited, thereby reducing battery deterioration due to memory effect, for example.

[1-3. Effects and Other Remarks]

As described above, digital camera 100 according to the present exemplary embodiment is an imaging device capable of interval shooting that allows images to be consecutively captured at predetermined image-capture intervals. Digital camera 100 includes USB interface 166 (an example of a power input unit), through which power is received from an external device connected to the USB interface 166; battery 162, which is charged with power received via USB interface 166, and which supplies power to operate digital camera 100; and microcontroller 170 (an example of a charge controller), which controls charging of battery 162. If digital camera 100 is performing an interval shooting operation (YES in S33), microcontroller 170 prohibits charging of battery 162, under a predetermined condition (S34). The predetermined condition may be a condition in which controller 120 is inactive (NO in S32), for example.

Such a configuration allows digital camera 100 to prohibit charging of battery 162 during the interval shooting operation. Accordingly, repetition of charging and discharging of the battery that would otherwise occur in interval shooting is inhibited in digital camera 100, thereby reducing battery deterioration, such as memory effect, for example.

Second Exemplary Embodiment

The following describes another example operation of microcontroller 170 in digital camera 100. The control in digital camera 100 described in the first exemplary embodiment is performed to reduce deterioration of battery 162 caused by repeated charging and discharging. Described in the present exemplary embodiment is a configuration that keeps a remaining battery capacity (an amount of charge) at least at a predetermined level during an interval shooting operation, in addition to accomplishing the objective of reducing battery deterioration.

Digital camera 100 becomes unable to operate when a remaining battery capacity reaches zero. It is thus undesirable for the remaining battery capacity to reach zero during an interval shooting operation. That is, it is important to prevent an excessive decrease in remaining battery capacity during an interval shooting operation. In light of this, a configuration that controls battery charging to prevent an excessive decrease in remaining battery capacity during an interval shooting operation will be described in the present exemplary embodiment. Digital camera 100 according to the present exemplary embodiment is configured in a similar manner to digital camera 100 described in the first exemplary embodiment. Also, digital camera 100 according to the present exemplary embodiment operates in a similar manner to digital camera 100 described in the first exemplary embodiment except for an operation described below.

Figure 6:
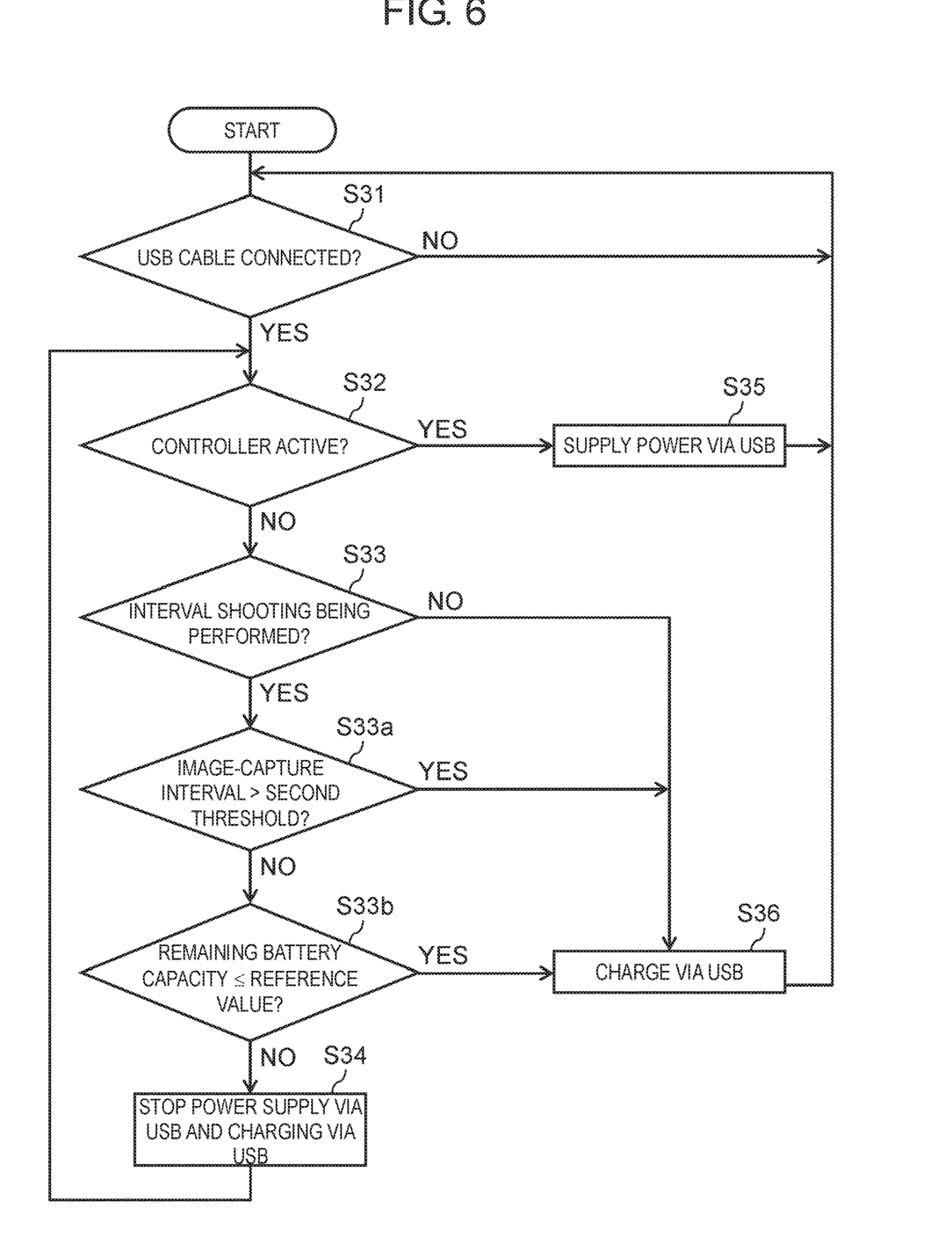
FIG. 6 is a flowchart illustrating how a microcontroller operates in a digital camera according to a second exemplary embodiment.

FIG. 6 is a flowchart illustrating how microcontroller 170 operates according to a second exemplary embodiment. In the flowchart of FIG. 6, steps S33a, S33b are additionally provided between steps S33 and S34 illustrated in the flowchart (FIG. 5) of the first exemplary embodiment.

Specifically, when controller 120 is inactive, and an interval shooting operation is being performed (in other words, if controller 120 is in the sleep state) (YES in S33), microcontroller 170 determines whether a set image-capture interval is greater than a second threshold (an example of a first predetermined value) (S33a). The second threshold is determined in consideration of a degree of an expected decrease in remaining battery capacity which is expected to occur when battery 162 is not charged during a period of time in which controller 120 is in the sleep state. The second threshold is set to 30 minutes, for example.

In the first exemplary embodiment, charging of battery 162 is always prohibited during the time when controller 120 is in the sleep state in interval shooting. In this case, a longer image-capture interval results in prohibition of charging of battery 162 for a longer time. Under normal conditions, the longer a set image-capture interval becomes, the longer the interval shooting lasts. Thus, the remaining battery capacity may gradually decrease during such long interval shooting, and, without the user's knowledge, may reach a level at which digital camera 100 stops operating. In view of this, in the present exemplary embodiment, when an image-capture interval is greater than a predetermined value (the second threshold), precedence is given to suppressing decrease in remaining battery capacity over reducing battery deterioration, and battery 162 is charged even when controller 120 is in the sleep state.

To this end, if a set image-capture interval is greater than the second threshold (YES in S33a), microcontroller 170 controls charge IC 164 in such a manner that battery 162 is charged with power received via USB interface 166 (i.e., battery 162 is charged via the USB connection) (S36). This prevents an excessive decrease in remaining capacity of battery 162.

If the set image-capture interval is equal to or less than the second threshold (NO in S33a), microcontroller 170 determines whether the remaining capacity of battery 162 is equal to or less than a reference value (S33b).

If the remaining capacity of battery 162 is equal to or less than the reference value (an example of a second predetermined value) (YES in S33b), microcontroller 170 controls charge IC 164 in such a manner that battery 162 is charged with power received via USB interface 166 (i.e., battery 162 is charged via the USB connection) (S36). In this manner, when it is determined that the remaining battery capacity is low, precedence is also given to suppressing decrease in remaining battery capacity over reducing battery deterioration, and battery 162 is charged to prevent an excessive decrease in remaining capacity of battery 162.

To be specific, when a user connects a USB cable to digital camera 100, the user has the latent expectation that battery 162 will be charged via the USB cable. Therefore, despite the connection of the USB cable to digital camera 100, if the remaining battery capacity decreases due to power consumption during interval shooting, the user's expectation is disappointed. To avoid such disappointment, when the remaining battery capacity is low, battery 162 is charged as described above to fulfill the expectation of the user who has connected the USB cable to digital camera 100.

If the remaining capacity of battery 162 is greater than the reference value (NO in S33b), microcontroller 170 stops power supply to controller 120 and charging of battery 162 with power received via USB interface 166 (S34). In this case, it is determined that the remaining battery capacity is sufficient, and thus charging of battery 162 is stopped (prohibited) to reduce battery deterioration.

Here, the reference value for remaining battery capacity, which is used in the determination in step S33b, will be described. The reference value is set based on a threshold for remaining battery capacity. This threshold is referred to in performing switching of a remaining capacity level indicated in a remaining-battery-capacity indication. Parts (A), (B) of FIG. 7 each show a remaining-battery-capacity indication which is displayed on liquid crystal monitor 130 of digital camera 100. The remaining capacity of battery 162 is indicated by the number of blocks 50 in a stepwise manner.

Figure 7:
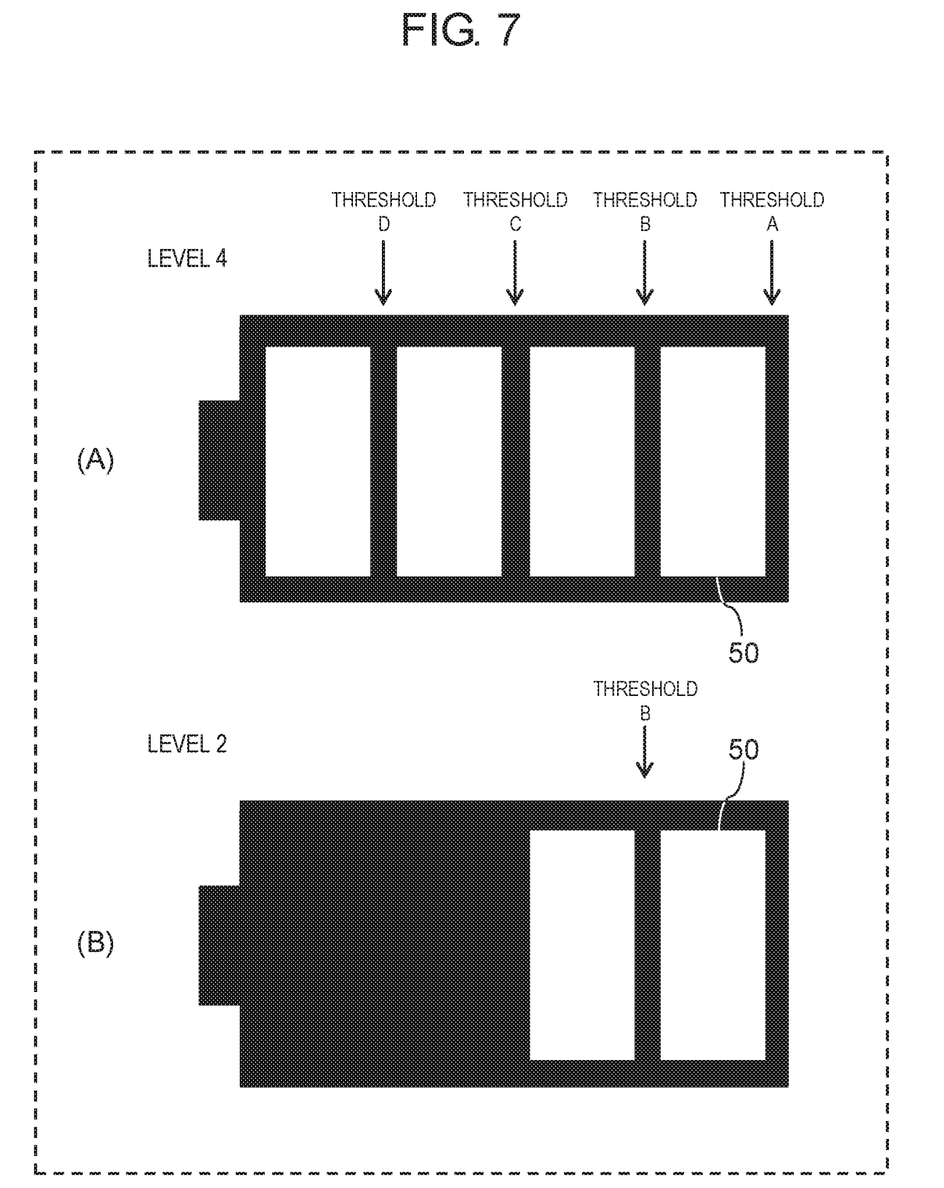
FIG. 7 illustrates icons indicating battery charge status.

The remaining battery capacity is displayed in five stages from level 0 to level 4. Level 0 denotes a state in which the remaining capacity of battery 162 is less than threshold A. In level 0, no block 50 is displayed. Level 1 denotes a state in which the remaining capacity of battery 162 is equal to or greater than threshold A and less than threshold B. In level 1, one block 50 is displayed. Level 2 denotes a state in which the remaining capacity of battery 162 is equal to or greater than threshold B and less than threshold C. In level 2, two blocks 50 are displayed. Level 3 denotes a state in which the remaining capacity of battery 162 is equal to or greater than threshold C and less than threshold D. In level 3, three blocks 50 are displayed. Level 4 denotes a state in which the remaining capacity of battery 162 is equal to greater than threshold D. In level 4, all four blocks 50 are displayed. Part (A) of FIG. 7 shows an example display indicating that the remaining battery capacity is at level 4. Part (B) of FIG. 7 shows an example display indicating that the remaining battery capacity is at level 2.

The reference value for remaining battery capacity is set to, for example, threshold B for remaining battery capacity, which is referred to in performing switching of the indication between level 1 and level 2. With this setting, the remaining capacity of battery 162 is always kept from falling below level 1. That is, at least one block 50 is always displayed in the remaining-battery-capacity indication on liquid crystal monitor 130. This enables the user to always see at least one block displayed, allowing for the user's visual recognition that the battery has a certain amount of remaining capacity.

Note that the multiple thresholds are provided for the switching of the indication of remaining-battery-capacity level. Namely, the thresholds are thresholds A to D, for example. Nevertheless, the reference value for remaining battery capacity used in the determination in step S33*b* may be any of those thresholds selected according to the user setting. The reference value for remaining battery capacity may not be a fixed value, but may be a variation. For example, the threshold (for example, any of thresholds A to D) to which the reference value for remaining battery capacity corresponds may be switched over from one to another depending on the remaining battery capacity indicated when a USB cable is connected to digital camera 100.

As described above, in the present exemplary embodiment, battery 162 is charged even during interval shooting, under a predetermined condition. The predetermined condition may be at least one of a case where the image-capture interval is longer than a predetermined length of time, and a case where the remaining battery capacity is less than a predetermined level. In this way, digital camera 100 suppresses decrease in remaining battery capacity during interval shooting.

Other Exemplary Embodiments

The first and second exemplary embodiments have been described above as examples of the technique disclosed in the present application. However, the technique in the present disclosure is not limited to these embodiments, but is applicable to other exemplary embodiments including appropriate modifications, substitutions, additions, omissions, and the like. In addition, new exemplary embodiments can be made by combining components described in the first and second exemplary embodiments.

In the above exemplary embodiments, a digital camera is described as an example of an imaging device. However, the imaging device is not limited to this. The imaging device may be any electronic device having a capability to capture images at regular time intervals, and including a built-in battery that is rechargeable with an external device. Examples of the imaging device include a video camera, a smartphone, a tablet terminal, and a portable telephone.

In the exemplary embodiments set forth above, a USB interface through which power is received in compliance with the USB standard is described as an example of a power input unit. However, the power input unit is not limited to this. The power input unit may be any unit including a circuit for receiving power from an external device according to a predetermined standard.

Controller 120 of digital camera 100 may include, in place of the CPU, a graphics processing unit (GPU), a micro processing unit (MPU), a field-programmable gate array (FPGA), or an application specific integrated circuit (ASIC), for example.

The Present Disclosure

The above exemplary embodiments disclose an imaging device described below.

(1) Imaging device (100) is capable of interval shooting that allows images to be consecutively captured at image-capture intervals predetermined beforehand. The imaging device includes: power input unit (166) through which power is received from an external device connected to the power input unit; battery (162) configured to be charged with the power received via the power input unit, and to supply power to operate the imaging device; and charge controller (170) configured to control charging of the battery. The charge controller (170) prohibits, under a predetermined condition (for example, NO in S32), the charging of the battery (S34) during the interval shooting performed by the imaging device (YES in S33).

This configuration inhibits repetition of charging and discharging of the battery that would otherwise occur in interval shooting, thereby reducing battery deterioration, such as memory effect, for example.

(2) In the imaging device described in (1), when a current one of the image-capture intervals is greater than a first predetermined value (YES in S33*a* in FIG. 6), the charge controller may be configured to charge the battery (S36) even during the interval shooting performed by the imaging device. This suppresses decrease in remaining battery capacity during the interval shooting.

(3) In the imaging device described in (1), when a remaining capacity of the battery is less than a second predetermined value (YES in S33*b* in FIG. 6), the charge controller may be configured to charge the battery (S36) even during the interval shooting performed by the imaging device. This suppresses decrease in remaining battery capacity during the interval shooting.

(4) The imaging device described in (3) may further include a display unit (130) configured to display the remaining capacity of the battery at a plurality of levels in a stepwise manner. The second predetermined value may be set to be equal to a threshold for the remaining capacity of the battery. The threshold is referred to in performing switching between the plurality of levels. This allows for a user's visual recognition that the battery has a certain level of remaining capacity.

(5) The imaging device described in (1) may further include an overall controller (120) configured to control an entire operation of the imaging device. When a current one of the image-capture intervals is equal to or greater than a third predetermined value (YES in S22), the overall controller (120) may transition to a sleep state (S25) upon completion of each of a plurality of image-capture operations. On the other hand, when the current image-capture interval is less than the third predetermined value (NO in S22), the overall controller does not need to transition to the sleep state upon completion of each of the plurality of image-capture operations. In this way, power is conserved by causing the overall controller to transition to the sleep state.

(6) In the imaging device described in (5), the charge controller may prohibit the charging of the battery (S34) when the overall controller is in the sleep state (NO in S32). This inhibits repetition of charging and discharging of the battery during the interval shooting, thereby reducing battery deterioration.

(7) In the imaging device described in (6), when the current image-capture interval is greater than a first predetermined value (YES in S33a), the charge controller may be configured to charge the battery (S36) even in a case where the overall controller is in the sleep state (NO in S32). This prevents battery depletion during the interval shooting operation.

(8) In the imaging device described in (6), when the remaining capacity of the battery is less than a second predetermined value (YES in S33b), the charge controller may be configured to charge the battery (S36) even in a case where the overall controller is in the sleep state (NO in S32). This prevents battery depletion during the interval shooting operation.

(9) In the imaging device described in (5), before transitioning to the sleep state, the overall controller may notify the charge controller that the interval shooting is being performed (S23). This enables the charge controller to recognize that the interval shooting operation is being performed and to provide control specific to that interval shooting operation.

(10) In the imaging device described in (5), before transitioning to the sleep state, the overall controller may notify the charge controller of the current image-capture interval (S24). This enables the charge controller to recognize the current image-capture interval and provide control based on that current image-capture interval.

(11) In the imaging device described in any one of (1) to (10), the power input unit may include a circuit that establishes connection with the external device in compliance with a universal serial bus standard.

The exemplary embodiments have been described herein as examples of the technique in the present disclosure. For this purpose, the accompanying drawings and the detailed description have been provided.

For illustration of the above technique, the components illustrated and described in the accompanying drawings and the detailed description may include not only components that are essential for solving the problem but also components that are not essential for solving the problem. Such non-essential components therefore should not be instantly construed as being essential, based on the fact that such non-essential components are illustrated and described in the accompanying drawings and the detailed description.

Furthermore, since the exemplary embodiments described above are intended to illustrate the technique in the present disclosure, various modifications, substitutions, additions, omissions, and the like can be made within the scope of the claims and the scope of equivalents thereof.

The present disclosure is applicable to an imaging device having an interval shooting capability that allows images to be consecutively captured at regular time intervals.

What is claimed is:

1. An imaging device capable of interval shooting that allows images to be consecutively captured at image-capture intervals predetermined beforehand, the imaging device comprising:

a power input unit through which the imaging device receives power from an external device connected to the power input unit;

a battery configured to be charged with the power received via the power input unit, and to supply the power to operate the imaging device; and a charge controller configured to control charging of the battery, wherein the charge controller prohibits, under a predetermined condition, the charging of the battery between immediately adjacent shots during the interval shooting performed by the imaging device.

2. The imaging device according to claim 1, wherein when a current one of the image-capture intervals is greater than a first predetermined value, the charge controller charges the battery even during the interval shooting performed by the imaging device.

3. The imaging device according to claim 1, wherein when a remaining capacity of the battery is less than a second predetermined value, the charge controller charges the battery even during the interval shooting performed by the imaging device.

4. The imaging device according to claim 3, further comprising a display unit configured to display the remaining capacity of the battery at a plurality of levels in a stepwise manner, wherein the second predetermined value is set to be equal to a threshold for the remaining capacity of the battery, the threshold being referred to in performing switching between the plurality of levels.

5. The imaging device according to claim 1, wherein in the interval shooting, a plurality of image-capture operations are performed at respective image-capture intervals, the imaging device further includes an overall controller configured to control a whole of the imaging device, when a current image-capture operation of one of the plurality of image-capture operations is performed at a respective image capture interval that is equal to or greater than a predetermined value, the overall controller transitions to a sleep state in which power supply to the overall controller is stopped, upon completion of each of the plurality of image-capture operations, and when the current image-capture interval is less than the predetermined value, the overall controller does not transition to the sleep state upon completion of each of the plurality of image-capture operations.

6. The imaging device according to claim 5, wherein the charge controller prohibits the charging of the battery when the overall controller is in the sleep state.

7. The imaging device according to claim 6, wherein a first predetermined value is greater than the third predetermined value, and when the current image-capture interval is greater than the first predetermined value, the charge controller charges the battery even in a case where the overall controller is in the sleep state.

8. The imaging device according to claim 6, wherein when a remaining capacity of the battery is less than a second predetermined value, the charge controller charges the battery even in a case where the overall controller is in the sleep state.

9. The imaging device according to claim 5, wherein before transitioning to the sleep state, the overall controller notifies the charge controller that the interval shooting is being performed.

10. The imaging device according to claim 5, wherein before transitioning to the sleep state, the overall controller notifies the charge controller of the current image-capture interval.

11. The imaging device according to claim 1, wherein the power input unit includes a circuit that establishes connection with the external device in compliance with a universal serial bus (USB) standard.

* * * * *